US011904609B2

(12) United States Patent
Ichikawa

(10) Patent No.: US 11,904,609 B2
(45) Date of Patent: Feb. 20, 2024

(54) INKJET HEAD, METHOD FOR DRIVING AN INKJET HEAD, AND INKJET PRINTER

(71) Applicant: TOSHIBA TEC KABUSHIKI KAISHA, Tokyo (JP)

(72) Inventor: Masaya Ichikawa, Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 132 days.

(21) Appl. No.: 17/369,883

(22) Filed: Jul. 7, 2021

(65) Prior Publication Data

US 2022/0184944 A1 Jun. 16, 2022

(30) Foreign Application Priority Data

Dec. 15, 2020 (JP) ................................ 2020-207505

(51) Int. Cl.
*B41J 29/38* (2006.01)
*B41J 2/045* (2006.01)

(52) U.S. Cl.
CPC ....... *B41J 2/04591* (2013.01); *B41J 2/04541* (2013.01); *B41J 2/04581* (2013.01)

(58) Field of Classification Search
CPC . B41J 2/04591; B41J 2/04541; B41J 2/04581
See application file for complete search history.

(56) References Cited

U.S. PATENT DOCUMENTS

| | | | | |
|---|---|---|---|---|
| 2003/0058306 | A1 | 3/2003 | Kobayashi et al. | |
| 2014/0104334 | A1 | 4/2014 | Ikarashi | |
| 2014/0168299 | A1 | 6/2014 | Kamibayashi et al. | |
| 2015/0015638 | A1* | 1/2015 | Shipway .............. | C09D 11/322 106/31.13 |

FOREIGN PATENT DOCUMENTS

| | | | |
|---|---|---|---|
| JP | 2006-224608 | A | 8/2006 |
| JP | 4003038 | B2 | 11/2007 |
| JP | 4923690 | B2 | 4/2012 |
| JP | 2019-098551 | A | 6/2019 |

OTHER PUBLICATIONS

Extended European Search Report dated Jan. 26, 2022 in corresponding European Patent Application No. 21188988.6, 8 pages.

* cited by examiner

*Primary Examiner* — Lam S Nguyen
(74) *Attorney, Agent, or Firm* — Kim & Stewart LLP

(57) ABSTRACT

An inkjet head includes a pressure chamber in which ink is stored, a nozzle plate including a nozzle which connects with the pressure chamber, an actuator configured to change a volume of the pressure chamber, and a drive circuit. The drive circuit, before a printing is performed, outputs, to the actuator for a first time period, a first signal for changing the volume of the pressure chamber without ejecting ink from the nozzle. A second signal for changing the volume of the pressure chamber is then output to the actuator for a second time period such that ink is ejected from the nozzle. A third signal for changing the volume of the pressure chamber to the extent that the ink is not ejected from the nozzle is then output to the actuator for a third time period.

16 Claims, 11 Drawing Sheets

INKJET HEAD, METHOD FOR DRIVING AN INKJET HEAD, AND INKJET PRINTER

CROSS-REFERENCE TO RELATED APPLICATION

This application is based upon and claims the benefit of priority from Japanese Patent Application No. 2020-207505, filed Dec. 15, 2020, the entire contents of which are incorporated herein by reference.

FIELD

Embodiments described herein relate generally to an inkjet head, a method for driving an inkjet head, and an inkjet printer incorporating an inkjet head.

BACKGROUND

In an inkjet head, in order to prevent an ink viscosity increase or ink solidification due to volatilization from an ink meniscus in a nozzle, a method for exciting a slight vibration in the ink within a pressure chamber connected to the nozzle is known. This slight vibration is insufficient to cause the ink to be ejected from the nozzle. In addition, there is a technique involving ejecting a small amount of ink from the nozzle during a non-printing time period.

In an inkjet head, sometimes a highly volatile ink such as a solvent-based ink may be used. Such a solvent-based ink can be much more volatile than common oil-based inks. For this reason, an increase in viscosity of ink or the solidification of the ink is not well prevented by the above-mentioned methods, and printing quality with such volatile inks may be deteriorated over time.

DETAILED DESCRIPTION

One or more embodiments provide an inkjet head capable of performing high-quality printing even when a highly volatile ink is used.

In general, according to one embodiment, an inkjet head includes a pressure chamber in which ink is stored, a nozzle plate including a nozzle which communicates with the pressure chamber, an actuator configured to change a volume of the pressure chamber, and a drive circuit. The drive circuit is configured to, before printing is performed: (i) output, to the actuator for a first time period, a first signal for changing the volume of the pressure chamber without ejecting ink from the nozzle, (ii) after outputting the first signal, output, to the actuator for a second time period, a second signal for changing the volume of the pressure chamber for ejecting ink from the nozzle, and (iii) after outputting the second signal, output, to the actuator for a third time period, a third signal for changing the volume of the pressure chamber without ejecting ink from the nozzle.

Hereinafter, certain example embodiments will be described with reference to the drawings.

Figure 1:
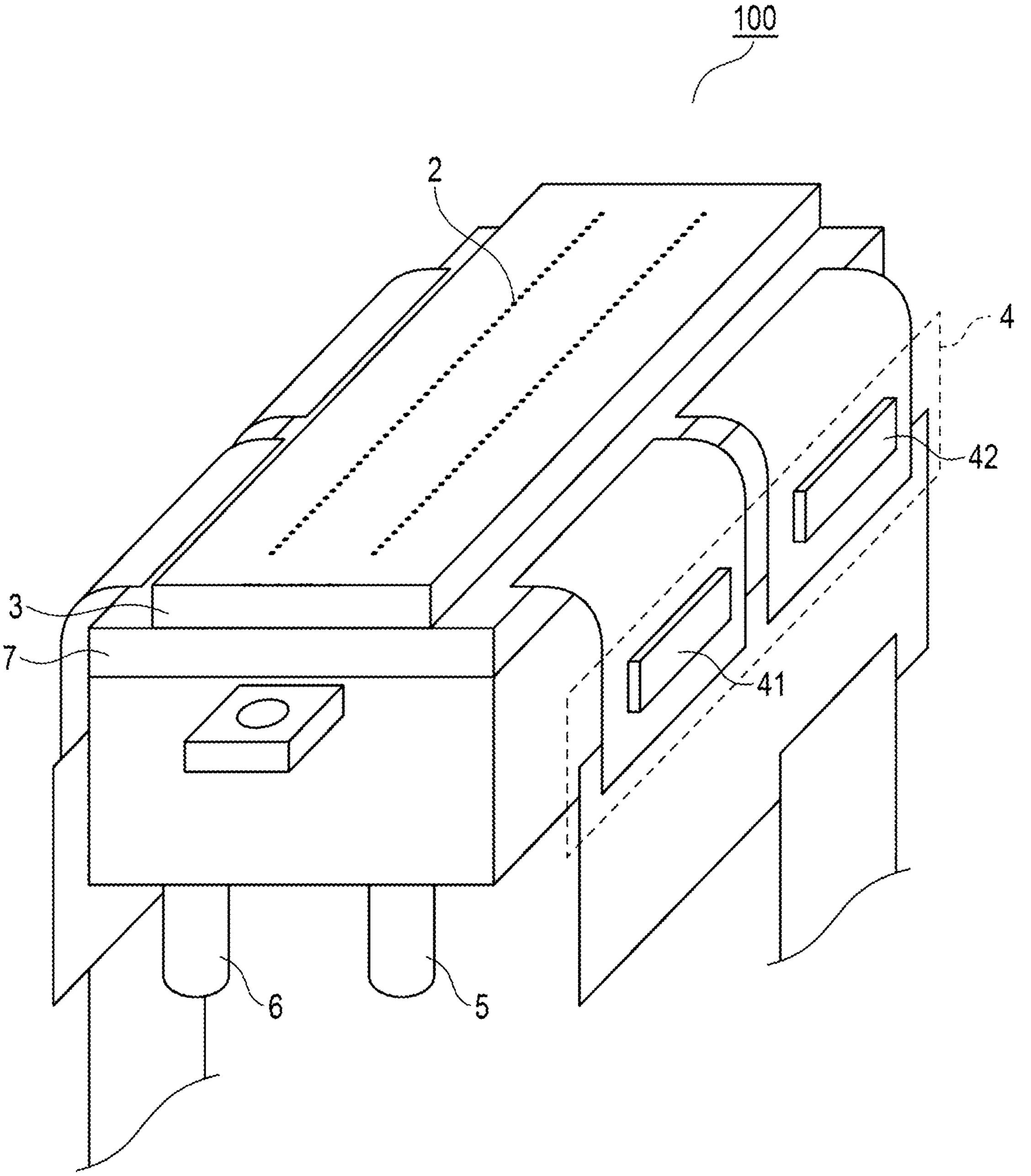
FIG. 1 is a perspective view of an inkjet head according to an embodiment.

FIG. 1 is a perspective view illustrating a shared wall type inkjet head 100. The inkjet head 100 includes a head main body 3 in which a plurality of nozzles 2 for ejecting ink is formed, a head driver 4 which generates a drive signal, and a manifold 7 which is provided with an ink supply port 5 and an ink discharge port 6. The head driver 4 includes two driver ICs 41 and 42. Each of the driver ICs 41 and 42 has the same circuit configuration. Each of the driver ICs 41 and 42 includes a head drive circuit 101.

The inkjet head 100 ejects the ink supplied from the ink supply port 5 through the nozzles 2 in response to a drive signal generated by the head driver 4. In addition, the inkjet head 100 discharges the ink that has not been ejected from the nozzles 2 through the ink discharge port 6.

Figure 2:
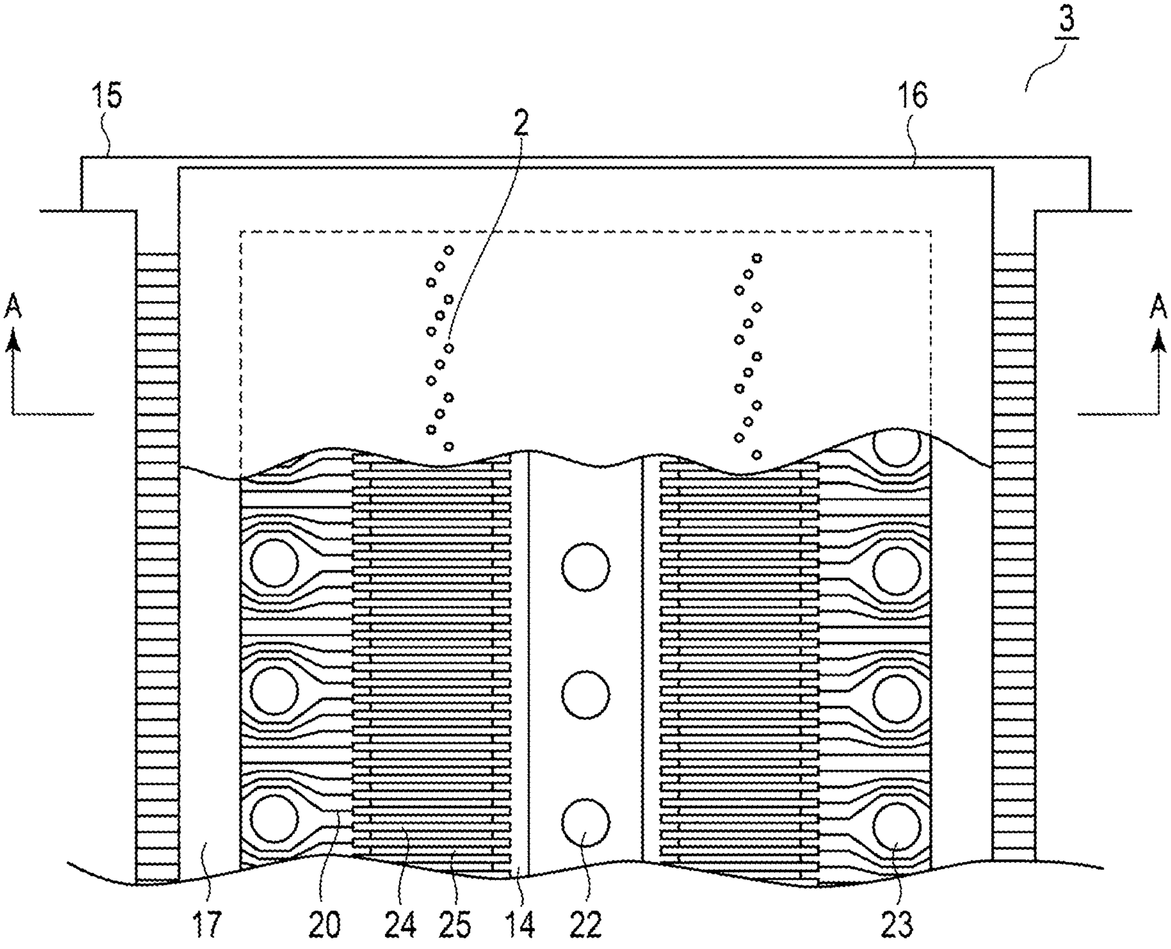
FIG. 2 is a plan view of a head main body of an inkjet head.

FIG. 2 is a plan view of the head main body 3. In addition, FIG. 3 is an A-A longitudinal cross-sectional view of the head main body 3 illustrated in FIG. 2, and FIG. 4 is a B-B lateral cross-sectional view of the head main body 3 illustrated in FIG. 3.

As illustrated in FIG. 2, the head main body 3 includes a piezoelectric member 14, a base substrate 15, a nozzle plate 16, and a frame member 17. The frame member 17 is joined onto the base substrate 15, and the piezoelectric member 14 is joined into the frame member 17. In the head main body 3, the nozzle plate 16 is adhered on the frame member 17. As illustrated in FIG. 3, in the head main body 3, a central space surrounded by the base substrate 15, the piezoelectric member 14, and the nozzle plate 16 is used as an ink supply path 18. In addition, in the head main body 3, a space in a peripheral portion surrounded by the base substrate 15, the piezoelectric member 14, the frame member 17, and the nozzle plate 16 is used as an ink discharge path 19. The nozzle plate 16 includes a plurality of nozzles 2.

Figure 3:
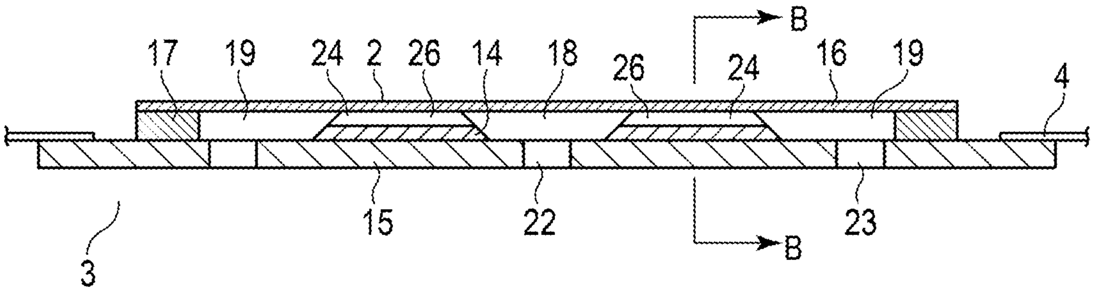
FIG. 3 is a longitudinal cross-sectional view of a head main body.

As illustrated in FIG. 3, the base substrate 15 has a hole 22 which communicates with the ink supply path 18 and a hole 23 which communicates with the ink discharge path 19. The hole 22 communicates with the ink supply port 5 by the manifold 7. The hole 23 communicates with the ink discharge port 6 by the manifold 7.

Figure 4:
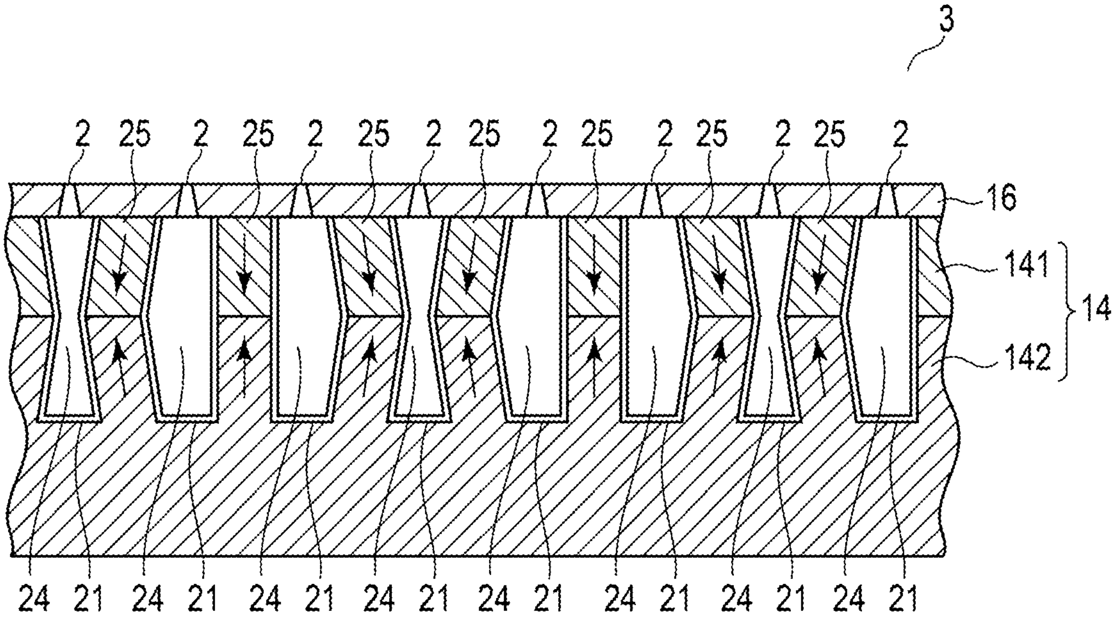
FIG. 4 is a lateral cross-sectional view of a head main body.

As illustrated in FIG. 4, the piezoelectric member 14 is formed by stacking, on a first piezoelectric member 141, a second piezoelectric member 142 having a polarity opposite to that of the first piezoelectric member 141. The first piezoelectric member 141 and the second piezoelectric member 142 are adhered to each other.

As illustrated in FIG. 3, the piezoelectric member 14 forms a plurality of elongated grooves 26 connected in parallel from the ink supply path 18 to the ink discharge path 19. As illustrated in FIG. 4, an electrode 21 is arranged on the inner surface of each of the elongated grooves 26. Each of the electrodes 21 is connected to the head driver 4 via a wiring 20. The space surrounded by each of the elongated grooves 26 and the back surface of the nozzle plate 16 adhered on the second piezoelectric member 142 so as to cover each of the elongated grooves 26 forms a pressure chamber 24. Each of the nozzles 2 communicates with a corresponding one of pressure chambers 24.

As illustrated in FIG. 4, the piezoelectric member 14 that forms the partition wall between the adjacent pressure chambers 24 is interposed by the electrodes 21 of the pressure chambers 24. As a result, in the head main body 3, an actuator 25 is formed by the piezoelectric member 14 and the electrodes 21 on both sides thereof. When an electric field is applied by the drive signal generated by the head drive circuit 101, the actuator 25 is shear-deformed in a "<" shape with a joint between the first piezoelectric member 141 and the second piezoelectric member 142 as an apex. Due to the deformation of the actuator 25, the volume of the pressure chamber 24 is displaced, and thus, the ink inside the pressure chamber 24 is pressurized. The pressurized ink is ejected from the nozzle 2 which communicates with the pressure chamber 24.

Next, the operating principle of the inkjet head 100 configured as described above will be described with reference to FIGS. 5A and 5C.

Figure 5A:
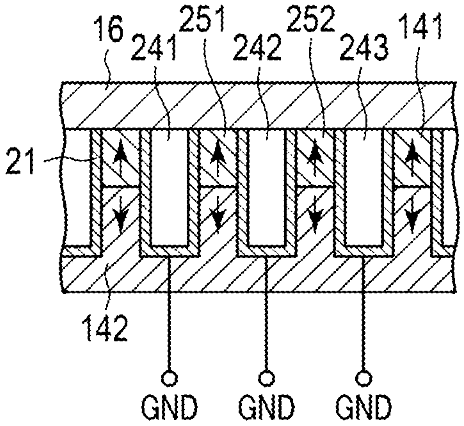
FIG. 5A to FIG. 5C are diagrams illustrating an operating principle of an inkjet head.

In FIG. 5A, all the potentials of the electrodes 21 arranged on the wall surfaces of a central pressure chamber 242 and both adjacent pressure chambers 241 and 243 adjacent to the pressure chamber 242 is a ground potential GND. In this state, any one of an actuator 251 interposed between the pressure chamber 241 and the pressure chamber 242 and an actuator 252 interposed between the pressure chamber 242 and the pressure chamber 243 are not subjected to a straining action.

Figure 5B:
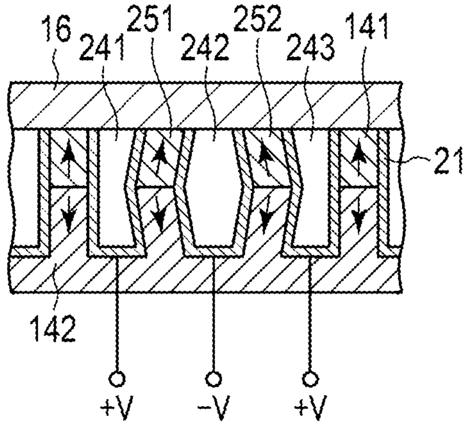

FIG. 5B illustrates a state in which a negative voltage −V is applied to the electrode 21 of the central pressure chamber 242 and a positive voltage +V is applied to the electrodes 21 of both of the adjacent pressure chambers 241 and 243. In this state, an electric field twice the voltage V acts on each of the actuators 251 and 252 in a direction perpendicular to the polarization directions of the piezoelectric members 141 and 142. By this action, each of the actuators 251 and 252 is deformed outward so as to expand the volume of the pressure chamber 242.

Figure 5C:
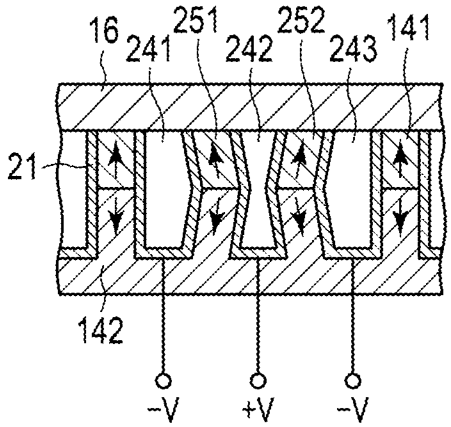

FIG. 5C illustrates a state in which the positive voltage +V is applied to the electrode 21 of the central pressure chamber 242 and the negative voltage −V is applied to the electrodes 21 of both of the adjacent pressure chambers 241 and 243. In this state, an electric field twice the voltage V acts on each of the actuators 251 and 252 in a direction opposite to that in FIG. 5B. By this action, each of the actuators 251 and 252 is deformed inward so as to contract the volume of the pressure chamber 242.

When the volume of the pressure chamber 242 is expanded or contracted, pressure vibration is generated in the pressure chamber 242. By the pressure vibration, the pressure in the pressure chamber 242 increases, and ink droplets are ejected from the nozzle 2 which communicates with the pressure chamber 242.

In this manner, the actuator 251 that separates the pressure chamber 241 and the pressure chamber 242, and the actuator 252 that separates the pressure chamber 242 and the pressure chamber 243 apply the pressure vibration to the inside of the pressure chamber 242 abutting the wall surfaces of both actuators 251 and 252. That is, the pressure chamber 242 shares the actuators 251 and 252 with the adjacent pressure chambers 241 and 243. Therefore, the head drive circuit 101 cannot individually drive each of the pressure chambers 24. The head drive circuit 101 drives (n+1) groups of the pressure chambers 24 obtained by dividing the pressure chambers 24 at n intervals (n is an integer of 2 or more). In an embodiment, three-division driving is used in which the head drive circuit 101 divisionally-drives three groups obtained by dividing the pressure chambers 24 at two intervals. It is noted that the three-division driving is merely an example, and four-division driving, five-division driving, or the like may be used.

Next, a configuration of an inkjet printer 200 including the inkjet head 100 will be described with reference to FIGS. 6 to 8. It is noted that, in the following description, a portion in which one actuator 25, the pressure chamber 24 of which one side wall is formed with the actuator 25, and the nozzle 2 which communicates with the pressure chamber 24 are combined is referred to as a channel. That is, the inkjet head 100 has a large number of channels, which is referred to as a channel group 102 (refer to FIG. 6).

Figure 6:
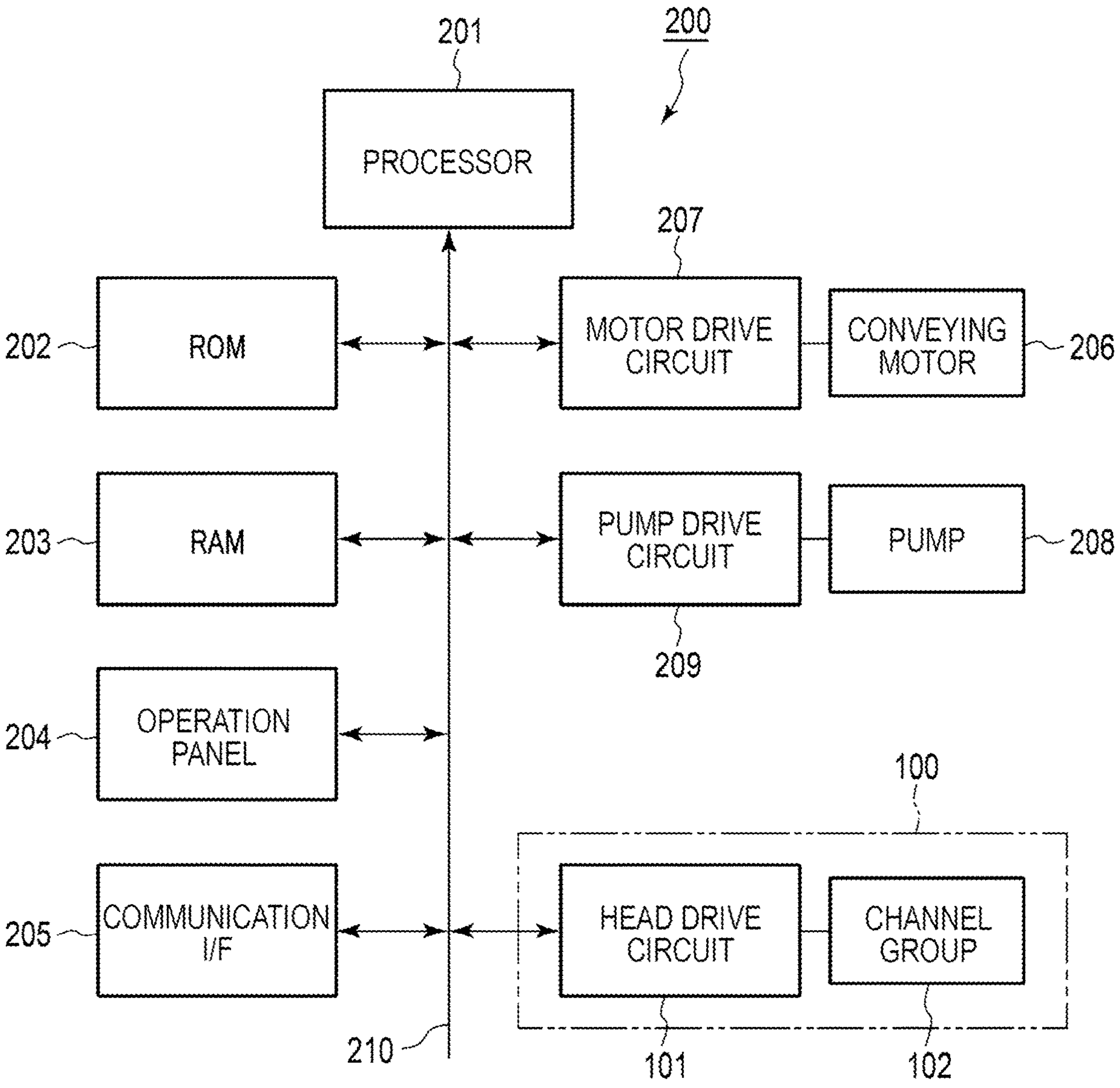
FIG. 6 is a hardware block diagram of an inkjet printer.
Figure 7:
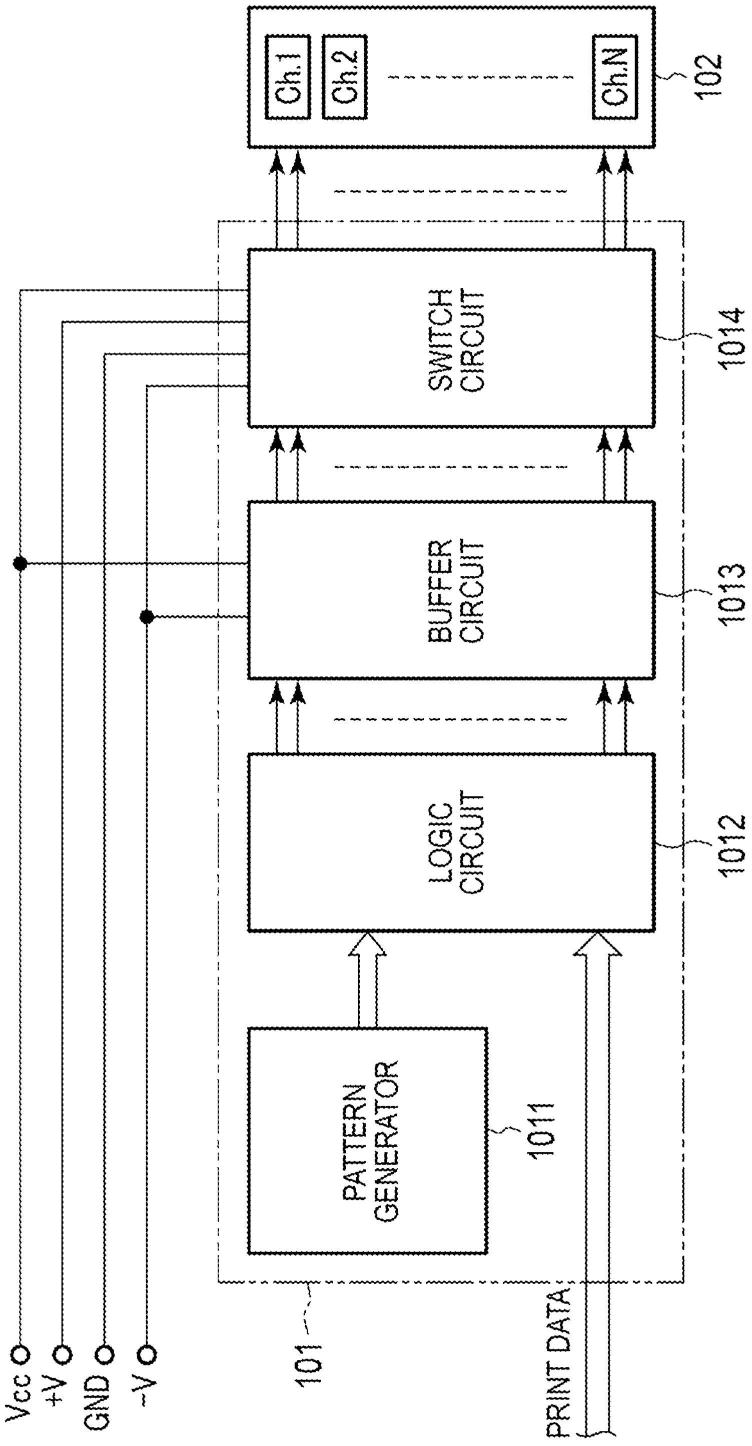
FIG. 7 is a block diagram illustrating a head drive circuit in an inkjet printer.
Figure 8:
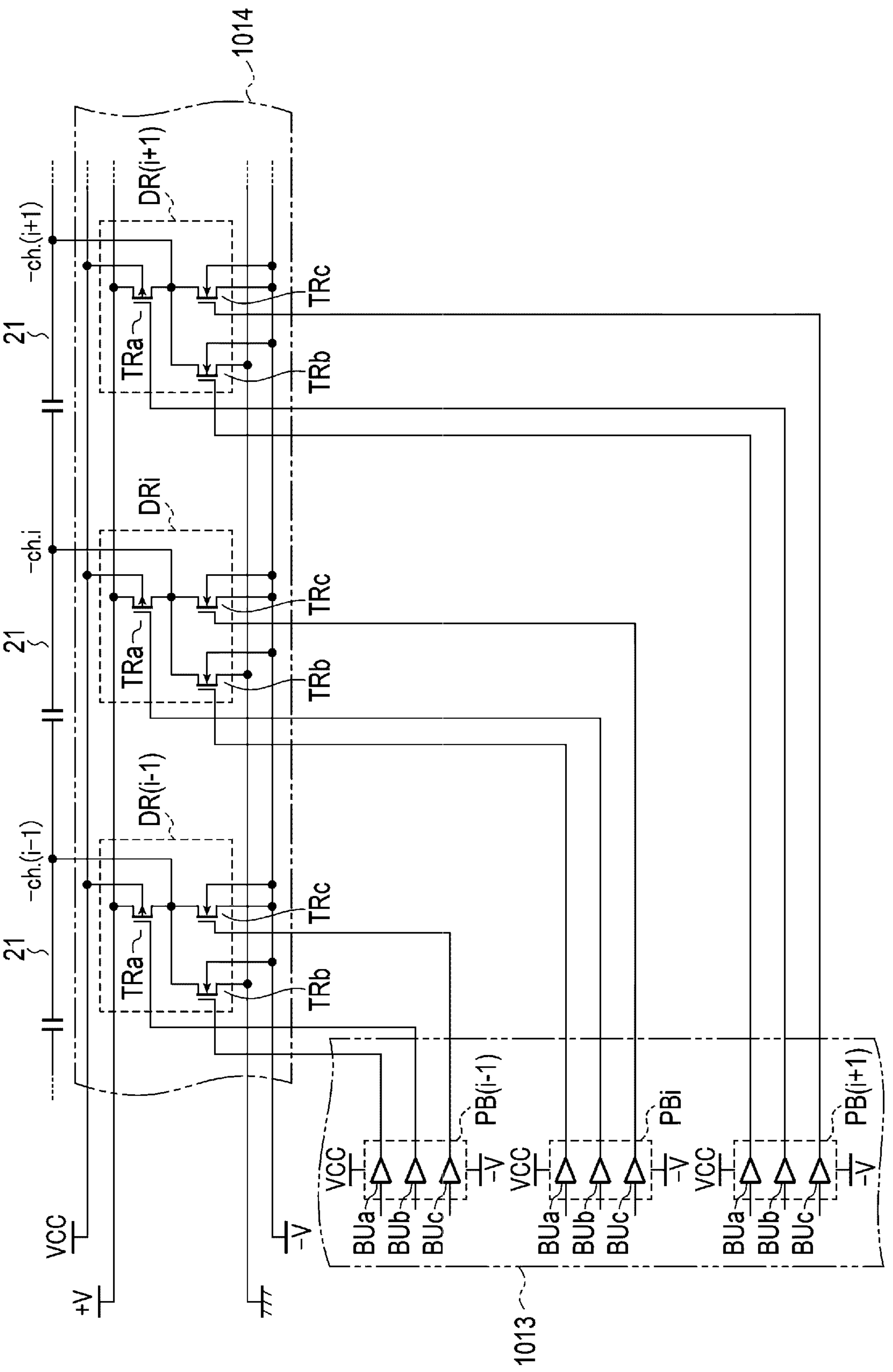
FIG. 8 is a schematic circuit diagram of a buffer circuit and a switch circuit included in a head drive circuit.

FIG. 6 is a block diagram illustrating a hardware configuration of the inkjet printer 200, FIG. 7 is a block diagram illustrating a specific configuration of the head drive circuit 101, and FIG. 8 is a schematic circuit diagram of a buffer circuit 1013 included in the head drive circuit 101 and a switch circuit 1014. The inkjet printer 200 is applied to office printers, bar code printers, POS (point-of-sale) printers, industrial printers, and the like.

The inkjet printer 200 includes a processor 201, a read only memory (ROM) 202, a random access memory (RAM) 203, an operation panel 204, a communication interface 205, a conveying motor 206, a motor drive circuit 207, a pump 208, a pump drive circuit 209, and the inkjet head 100. In addition, the inkjet printer 200 includes a bus line(s) 210 such as an address bus and a data bus. The processor 201, the ROM 202, the RAM 203, the operation panel 204, the communication interface 205, the motor drive circuit 207, the pump drive circuit 209, and the head drive circuit 101 are connected to each other via the bus line 210.

The processor 201 controls each component of the inkjet printer 200 in order to perform various functions as the inkjet printer 200 according to an operating system and one or more application programs.

The ROM 202 stores the above-mentioned operating system and application programs. The ROM 202 may store data necessary for the processor 201 to execute a process for controlling each component.

The RAM 203 stores data necessary for the processor 201 to execute the process. The RAM 203 is also used as a work area where information is appropriately rewritten by the processor 201. The work area functions as an image memory into which print data is loaded.

The operation panel 204 has an operation unit and a display unit. The operation unit includes function keys such as a power key, a paper feed key, and an error release key. The display unit can display various states of the inkjet printer 200.

The communication interface 205 receives print data from a client terminal connected via a network such as a local area network (LAN). For example, when an error occurs in the inkjet printer 200, the communication interface 205 transmits a signal notifying the error to the client terminal or the like.

The motor drive circuit 207 controls the conveying motor 206. The conveying motor 206 functions as a drive source for a conveying mechanism that conveys a recording medium such as printing paper. When the conveying motor 206 is driven, the conveying mechanism conveys the recording medium to the printing position by the inkjet head 100. The conveying mechanism discharges the printing-completed recording medium from a discharge port (not illustrated) to the outside of the inkjet printer 200.

The pump drive circuit 209 controls the pump 208. When the pump 208 is driven, the ink in an ink tank (not illustrated) is supplied to the inkjet head 100.

The head drive circuit 101 drives the channel group 102 of the inkjet head 100 according to the print data. As illustrated in FIG. 7, the head drive circuit 101 includes a pattern generator 1011, a logic circuit 1012, a buffer circuit 1013, and a switch circuit 1014.

The pattern generator 1011 generates waveform patterns such as an ejection relevant waveform, an ejection both adjacent waveform, a non-ejection relevant waveform, and a non-ejection both adjacent waveform. The waveform pattern data generated by the pattern generator 1011 is supplied to the logic circuit 1012.

The logic circuit 1012 receives the input of the print data read line by line from the image memory. When the print data is input, the logic circuit 1012 sets three adjacent channels ch.(i−1), ch.i, and ch.(i+1) of the inkjet head 100 as one set, and it is determined whether the central channel ch.i is an ejection channel that ejects the ink or a non-ejection channel that does not eject the ink. When the channel ch.i is an ejection channel, the logic circuit 1012 outputs the pattern data of the ejection relevant waveform to the channel ch.i, and the logic circuit 1012 outputs the pattern data of the ejection both adjacent waveforms to both adjacent channels ch.(i−1) and ch.(i+1). When the channel ch.i is a non-ejection channel, the logic circuit 1012 outputs the pattern data of the non-ejection relevant waveform to the channel ch.i, and the logic circuit 1012 outputs the pattern data of the non-ejection both adjacent waveforms to both adjacent channels ch.(i−1) and ch.(i+1). Each of the pattern data output from the logic circuit 1012 is output to the buffer circuit 1013.

The buffer circuit 1013 is connected to a power supply terminal to which the positive voltage Vcc is applied and a power supply terminal to which the negative voltage −V is applied. In addition, as illustrated in FIG. 8, the buffer circuit 1013 includes pre-buffers PB1, PB2, . . . , PBn for each of channels ch.1, ch.2, . . . , ch.N of the inkjet head 100. It is noted that, in FIG. 8, the pre-buffers PB(i−1), PBi, and PB(i+1) corresponding to the three adjacent channels ch.(i−1), ch.i, and ch.(i+1) are illustrated.

Each of the pre-buffers PB1, PB2, . . . , PBn has three buffers, that is, a first buffer BUa, a second buffer BUb, and a third buffer BUc. All the first buffer BUa, the second buffer BUb, and the third buffer BUc are connected to the power supply terminal to which the positive voltage Vcc is applied and the power supply terminal to which the negative voltage −V is applied. The outputs of the first buffer BUa, the second buffer BUb, and the third buffer BUc change according to the level of the signal supplied from the logic circuit 1012.

From the logic circuit 1012, signals having different levels are supplied according to whether the corresponding channel ch.k (1≤k≤N) is an ejection channel or a non-ejection channel or whether the corresponding channel ch.k is a channel adjacent to the ejection channel or the non-ejection channel. When a high level signal is supplied, the first buffer BUa, the second buffer BUb, or the third buffer BUc outputs a signal indicating the positive voltage Vcc level. When a low level signal is supplied, the first buffer BUa, the second buffer BUb, or the third buffer BUc outputs a signal indicating the negative voltage −V level.

The outputs of the pre-buffers PBa, PBb, . . . , PBn, that is, the output signals of the first buffer BUa, the second buffer BUb, and the third buffer BUc are output to the switch circuit 1014. The switch circuit 1014 is electrically connected to the power supply terminal to which the positive voltage Vcc is applied, a power supply terminal to which the positive voltage +V is applied, the power supply terminal to which the negative voltage −V is applied, and the ground potential GND. The positive voltage Vcc is higher than the positive voltage +V. As typical values, the positive voltage Vcc is 24 V, and the positive voltage +V is 15 V. In such a case, the negative voltage −V is −15 V.

As illustrated in FIG. 8, the switch circuit 1014 has drivers DR1, DR2, . . . , DRn for the channels ch.1, ch.2, . . . , ch.N of the inkjet head 100. It is noted that, in FIG. 8, drivers DR(i−1), DRi, and DR(i+1) corresponding to the three adjacent channels ch.(i−1), ch.i, and ch.(i+1) are illustrated.

Each of the drivers DR1, DR2, . . . , DRn includes a PMOS type field effect transistor TRa (hereinafter referred to as a first transistor TRa) and two NMOS type field effect transistors TRb and TRc (hereinafter referred to as a second transistor TRb and a third transistor TRc). In each of the drivers DR1, DR2, . . . , DRn, the first transistor TRa and the second transistor TRb are connected in series between the power supply terminal of the positive voltage +V and the ground potential GND, and the third transistor TRc is connected between a connection point of the first transistor TRa and the second transistor TRb and the power supply terminal to which the negative voltage −V is applied. In addition, in each of the drivers DR1, DR2, . . . , DRn, a back gate of the first transistor TRa is connected to the power supply terminal to which the positive voltage Vcc is applied, and each of back gates of the second transistor TRb and the third transistor TRc is connected to the power supply to which the negative voltage −V is applied. Furthermore, in each of the drivers DR1, DR2, . . . , DRn, the first buffer BUa of the corresponding pre-buffers PB1, PB2, . . . , PBn is connected to the gate of the second transistor TRb, the second buffer BUb is connected to the gate of the first transistor TRa, and the third buffer BUc is connected to the gate of the third transistor TRc. Finally, each of the drivers DR1, DR2, . . . , DRn applies the potential of the connection point between the first transistor TRa and the second transistor TRb to the electrodes 21 of the corresponding channels ch.1, ch.2, . . . , ch.N.

Therefore, when a signal indicating the positive voltage Vcc level is input from the second buffer BUb, the first transistor TRa is turned off, and when a signal indicating the negative voltage −V level is input, the first transistor TRa is turned on. When a signal indicating the positive voltage Vcc level is input from the first buffer BUa, the second transistor TRb is turned on, and when a signal indicating the negative voltage −V level is input, the second transistor TRb is turned off. When a signal indicating the positive voltage Vcc level is input from the third buffer BUc, the third transistor TRc is turned on, and when a signal indicating the negative voltage −V level is input, the third transistor TRc is turned off.

In each of the drivers DR1, DR2, . . . , DRn having such a configuration, when the first transistor TRa is turned on and the second transistor TRb and the third transistor TRc are turned off, the positive voltage +V is applied to the electrodes 21 of the corresponding channels ch.1, ch.2, . . . , ch.N. In each of the drivers DR1, DR2, . . . , DRn, when the first transistor TRa and the third transistor TRc are turned off at the same time and the second transistor TRb is turned on, the potentials of the electrodes 21 of the corresponding channels ch.1, ch.2, . . . , ch.N are the ground potential GND. In each of the drivers DR1, DR2, . . . , DRn, when the first transistor TRa and the second transistor TRb are turned off at the same time and the third transistor TRc is turned on, the negative voltage −V is applied to the N electrodes 21 of the corresponding channels ch.1, ch.2, . . . , ch.N.

Figure 9:
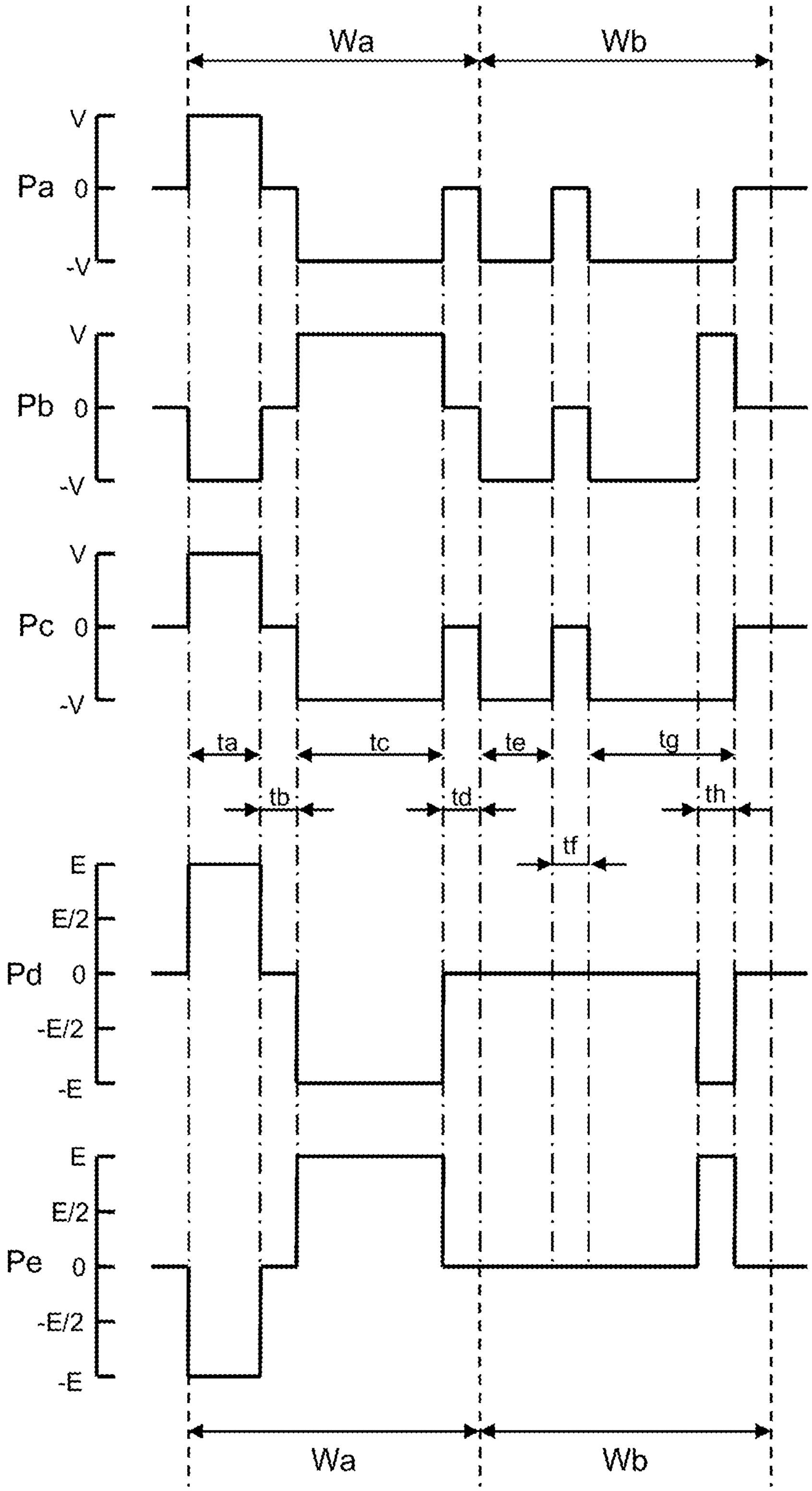
FIG. 9 is a waveform diagram illustrating a relationship between a signal applied to an actuator and an electric field generated in the actuator.

Next, a relationship between the signal supplied from the head drive circuit 101 to the channel group 102 and the electric field generated in the actuator 25 will be described with reference to FIG. 9. In FIG. 9, a section Wa is a signal for ejecting one ink droplet from the central channel ch.i among the three adjacent channels ch.(i−1), ch.i, and ch.(i+1). Hereinafter, the signal corresponding to the section Wa is referred to as a drive signal. A section Wb is a signal for exciting slight vibration in the ink inside the pressure chamber 24 that forms a meniscus in the nozzle 2 to the extent that the ink is not ejected from the nozzle 2 in the central channel ch.i. Hereinafter, the signal corresponding to the section Wb is referred to as a precursor signal.

The pulse waveform Pa indicates a drive signal and a precursor signal to be supplied to the channel ch.(i−1). The pulse waveform Pb indicates a drive signal and a precursor signal to be supplied to the channel ch.i. The pulse waveform Pc indicates a drive signal and a precursor signal to be supplied to the channel ch.(i+1). That is, the pulse waveform Pb is a signal according to the pattern data of the ejection relevant waveform generated by the pattern generator 1011. The pulse waveform Pa and the pulse waveform Pc are signals according to the pattern data of the ejection both adjacent waveforms generated by the pattern generator 1011.

The pulse waveform Pd represents a fluctuation waveform of the electric field generated in the actuator 251 which is one partition wall of the channel ch.i. The pulse waveform Pe represents the fluctuation waveform of the electric field generated in the actuator 252 which is the other partition wall of the channel ch.i. As illustrated in the figure, the electric field generated in the actuator 252 are inverted from the electric field generated in the actuator 251.

First, the section Wa of the drive signal will be described.

In the section Wa, the head drive circuit 101 first outputs the signals represented by a pulse waveform Pa, a pulse waveform Pb, and a pulse waveform Pc for a first time ta. By these signals, the negative voltage −V is applied to the central channel ch.i, and the positive voltage +V is applied to the both adjacent channels ch. (i−1) and ch.(i+1). As a result, as illustrated in a pulse waveform Pd and a pulse waveform Pe, an electric field “E” is generated in the actuator 251 and an electric field “−E” is generated in the actuator 252. As illustrated in FIG. 5B, due to such electric field fluctuation, the pressure chamber 242 corresponding to the channel ch.i is expanded, and thus, the ink is supplied to the pressure chamber 242. Herein, the signals represented by the pulse waveform Pa, the pulse waveform Pb, and the pulse waveform Pc output at the first time to is referred to as expansion pulses.

Subsequently, the head drive circuit 101 outputs the signals represented by the pulse waveform Pa, the pulse waveform Pb, and the pulse waveform Pc for a second time tb. By these signals, the voltage applied to each of the channels ch.(i−1), ch.i, and ch.(i+1) returns to the ground potential GND. As a result, as illustrated in the pulse waveform Pd and the pulse waveform Pe, all the electric fields of the actuators 251 and 252 become “0”. As illustrated in FIG. 5A, due to such electric field fluctuation, the volume of the pressure chamber 242 corresponding to the channel ch.i returns to the steady state. Due to the displacement of the volume at this time, the pressure in the pressure chamber 242 increases, and the ink droplets are ejected from the nozzle 2 which communicates with the pressure chamber 242.

Subsequently, the head drive circuit 101 outputs the drive signals represented by the pulse waveform Pa, the pulse waveform Pb, and the pulse waveform Pc for a third time tc. By these drive signals, the positive voltage +V is applied to the central channel ch.i, and the negative voltage −V is applied to the both adjacent channels ch.(i−1) and ch.(i+1). As a result, as illustrated in the pulse waveform Pd and the pulse waveform Pe, an electric field “−E” is generated in the actuator 251 and an electric field “E” is generated in the actuator 252. As illustrated in FIG. 5C, due to such electric field fluctuation, the pressure chamber 242 corresponding to the channel ch.i is contracted. Due to the displacement of the volume at this time, the pressure vibration after the ink ejection in the pressure chamber 242 is suppressed. Herein, the signals represented by the pulse waveform Pa, the pulse waveform Pb, and the pulse waveform Pc output at the third time tc are referred to as contraction pulses.

After that, the head drive circuit 101 outputs the drive signals represented by the pulse waveform Pa, the pulse waveform Pb, and the pulse waveform Pc for a fourth time td. By these drive signals, the voltage applied to each of the channels ch.(i−1), ch.i, and ch.(i+1) returns to the ground potential GND. As a result, as illustrated in the pulse waveform Pd and the pulse waveform Pe, all the electric fields of the actuators 251 and 252 become “0”. As illustrated in FIG. 5A, due to such electric field fluctuation, the volume of the pressure chamber 242 corresponding to the channel ch.i returns to the steady state.

Next, the section Wb of the precursor signal will be described.

In the section Wb, the head drive circuit 101 first outputs the signals represented by the pulse waveform Pa, the pulse waveform Pb, and the pulse waveform Pc for a fifth time to equal to the first time ta. By these signals, the negative voltage −V is applied to each of the channels ch.(i−1), ch.i, and ch.(i+1). As a result, as illustrated in the pulse waveform Pd and the pulse waveform Pe, the electric fields of the actuators 251 and 252 maintain “0”.

Subsequently, the head drive circuit 101 outputs the signals represented by the pulse waveform Pa, the pulse waveform Pb, and the pulse waveform Pc for a sixth time tf equal to the second time tb. By these signals, the voltage applied to each of the channels ch.(i−1), ch.i, and ch.(i+1) returns to the ground potential GND. As a result, as illustrated in the pulse waveform Pd and the pulse waveform Pe, the electric fields of the actuators 251 and 252 maintain “0”.

Subsequently, the head drive circuit 101 outputs the signals represented by the pulse waveform Pa, the pulse waveform Pb, and the pulse waveform Pc for a seventh time tg equal to the third time tc. By these signals, first, the negative voltage −V is applied to each of the channels ch.(i−1), ch.i, and ch.(i+1). Then, when the time obtained by subtracting an eighth time th from the seventh time tg elapses, the positive voltage +V is applied only to the central channel ch.i. As a result, as illustrated in the pulse waveform Pd and the pulse waveform Pe, an electric field “−E” is generated in the actuator 251 only for the eighth time th when the central channel ch.i returns to the positive potential, and an electric field “E” is generated in the actuator 252. Due to such electric field fluctuation, the ink inside the pressure chamber 242 corresponding to the channel ch.i slightly vibrates. That is, in the section Wb, slight vibration is excited in the ink inside the pressure chamber 24 by displacing the volume of the pressure chamber 24 to the extent that the ink is not ejected from the nozzle 2.

Figure 10:
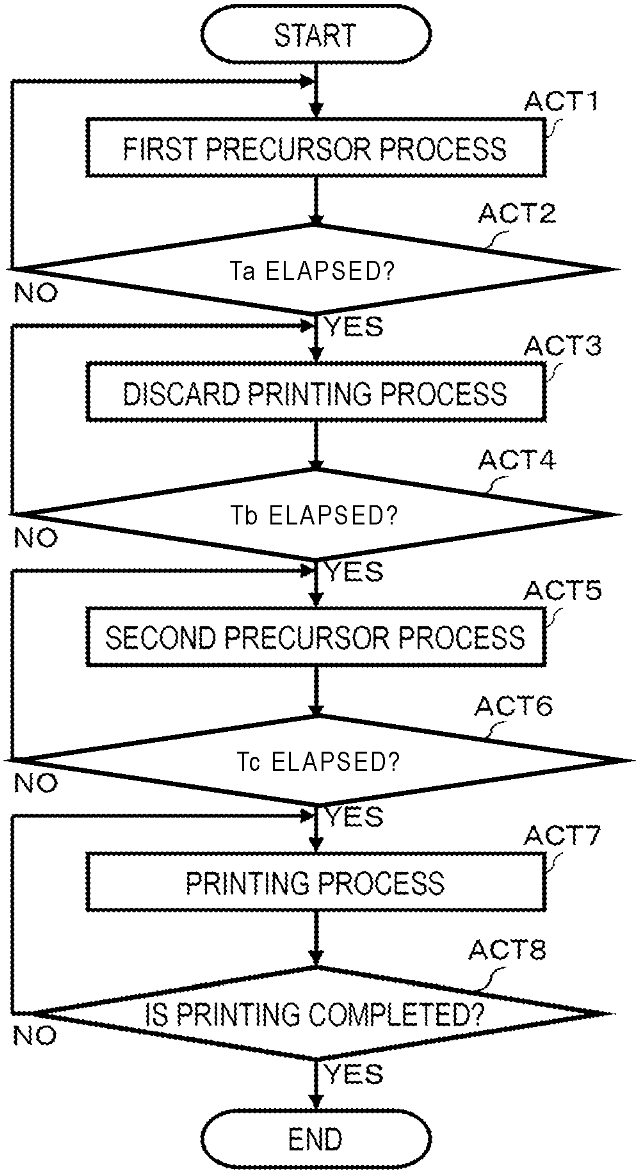
FIG. 10 is a flow chart of a printing process of a head drive circuit.

FIG. 10 is a flow chart of the printing process performed by the head drive circuit 101. When the head drive circuit 101 is instructed to start printing the print data, the head drive circuit 101 starts the printing process illustrated in FIG. 10. First, as ACTT, the head drive circuit 101 outputs a first signal for a first precursor process to the channel group 102.

The first precursor process is a process of exciting slight vibration in the ink inside the pressure chamber 24 by displacing the volume of the pressure chamber 24 which communicates with each nozzle 2 to the extent that the ink is not ejected from the nozzles 2. For example, in the case of applying the first precursor process to the central channel ch.i among the three adjacent channels ch.(i−1), ch.i, and ch.(i+1) of the inkjet head 100, the head drive circuit 101 outputs a signal corresponding to the section Wb of the pulse waveform Pb illustrated in FIG. 9 to the central channel ch.i. In addition, the head drive circuit 101 outputs signals corresponding to the section Wb of the pulse waveform Pa and the pulse waveform Pc illustrated in FIG. 9 to the both adjacent channels ch.(i−1) and ch.(i+1). As described above, the first signal is a signal corresponding to the section Wb of the pulse waveforms Pa, Pb, and Pc illustrated in FIG. 9, that is, a precursor signal.

As ACT2, the head drive circuit 101 determines whether the first time Ta has elapsed. The head drive circuit 101 repeats the first precursor process until the first time Ta elapses. The first time Ta is the time required to achieve stable ink ejection at the time of the start of printing.

As ACT3, when the first time Ta has elapsed, the head drive circuit 101 outputs a second signal for a discard printing process to the channel group 102.

The discard printing process is a process of ejecting a small amount of ink from each nozzle 2. For example, in the case of applying the discard printing process to the central channel ch.i among the three adjacent channels ch.(i−1), ch.i, and ch.(i+1) of the inkjet head 100, the head drive circuit 101 outputs a signal corresponding to the section Wa of the pulse waveform Pb illustrated in FIG. 9 to the central channel ch.i. In addition, the head drive circuit 101 outputs signals corresponding to the section Wa of the pulse waveform Pa and the pulse waveform Pc illustrated in FIG. 9 to the both adjacent channels ch.(i−1) and ch.(i+1). As described above, the second signal is a signal corresponding to the section Wa of the pulse waveforms Pa, Pb, and Pc illustrated in FIG. 9, that is, a drive signal.

As ACT4, the head drive circuit 101 determines whether the second time Tb has elapsed. The head drive circuit 101 repeats the discard printing process until the second time Tb elapses. The second time Tb is a time required for ejecting the ink that forms the meniscus in the nozzle 2.

As ACT5, when the second time Tb has elapsed, the head drive circuit 101 outputs a third signal for a second precursor process to the channel group 102.

Similar to the first precursor process, the second precursor process is a process of exciting slight vibration in the ink inside the pressure chamber 24 by displacing the volume of the pressure chamber 24 which communicates with each nozzle 2 to the extent that the ink is not ejected from the nozzles 2. Similar to the first signal, the third signal is a signal corresponding to the section Wb of the pulse waveforms Pa, Pb, and Pc illustrated in FIG. 9, that is, a precursor signal.

As ACT6, the head drive circuit 101 determines whether the third time Tc has elapsed. The head drive circuit 101 repeats the second precursor process until the third time Tc elapses. The third time Tc is a time required for a user to recognize that printing with the ink ejected only for the second time Tb is a discard printing.

As ACT7, when a third time T3 has elapsed, the head drive circuit 101 outputs a fourth signal for the printing process to the channel group 102.

The printing process is a process of printing characters, images, or the like of the print data on a recording medium by ejecting the number of ink droplets according to graduation from the nozzle 2 as an ejection target for each line based on the print data. For example, when the central channel ch.i among the three adjacent channels ch.(i−1), ch.i, and ch.(i+1) of the inkjet head 100 is an ink ejection target, the head drive circuit 101 outputs a signal according to the pattern data of the ejection relevant waveform to the channel ch.i. In addition, the head drive circuit 101 outputs signals according to the pattern data of the ejection both adjacent waveforms to the both adjacent channels ch.(i−1) and ch.(i+1). On the other hand, when the central channel ch.i is not an ink ejection target, the head drive circuit 101 outputs a signal according to the pattern data of the non-ejection relevant waveform to the channel ch.i. In addition, the head drive circuit 101 outputs signals according to the pattern data of the non-ejection both adjacent waveforms to the both adjacent channels ch. (i−1) and ch.(i+1).

The head drive circuit 101 determines whether the printing of the print data is completed. The head drive circuit 101 repeats the printing process until the printing is completed. When the printing is completed, the head drive circuit 101 completes the printing process illustrated in FIG. 10.

Figure 11:
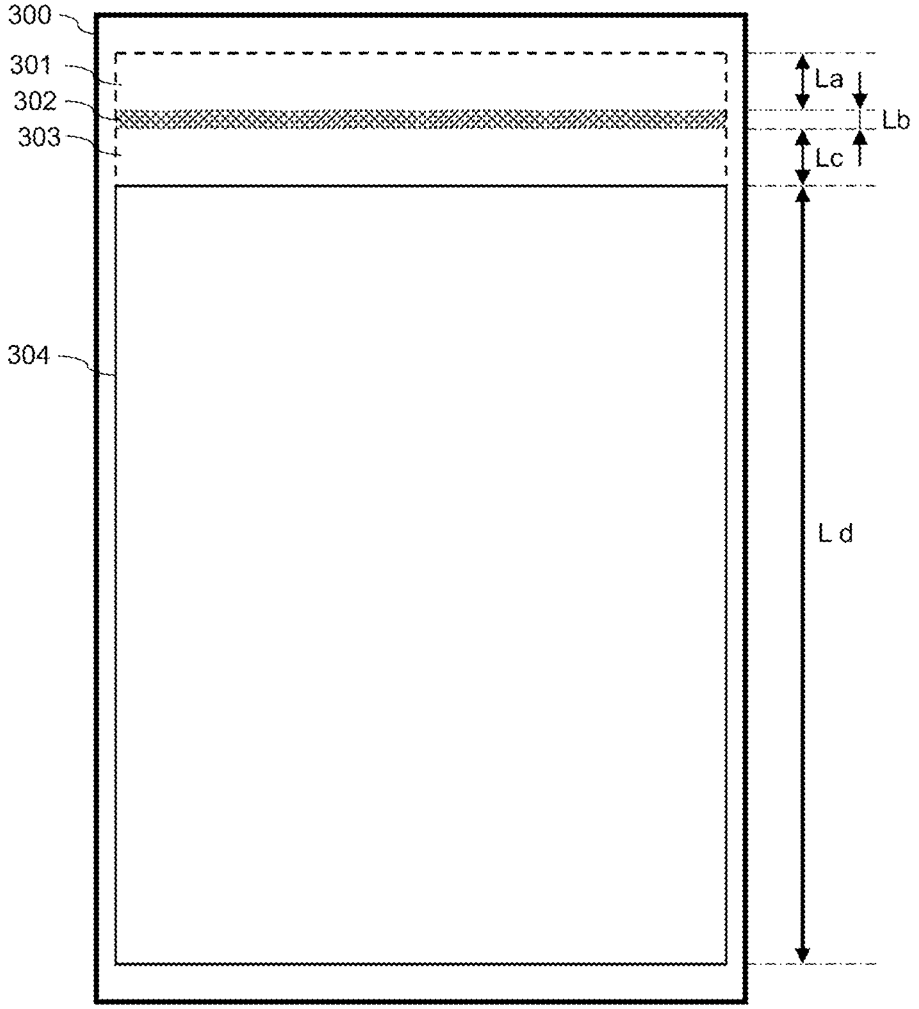
FIG. 11 is a schematic view illustrating a printing process performed by a head drive circuit.

FIG. 11 illustrates an example of a print medium 300 on which the print data is printed in the printing process illustrated in FIG. 10. In FIG. 11, a region 301 indicated by a width La is formed when the first precursor process is performed. The width La of the region 301 is determined by the first time Ta. A region 302 indicated by a width Lb is formed when the discard printing process is performed. The width Lb of the region 302 is determined by the second time Tb. A region 303 indicated by a width Lc is formed when the second precursor process is performed. The width Lc of the region 303 is determined by the third time Tc. A region 304 indicated by a width Ld is formed when the printing process is performed. The width Ld of the region 304 is determined by the number of lines of print data.

As described above, for the print medium 300, first, a margin of the number of lines corresponding to the width La is formed by the first precursor process. Subsequently, the printing for the number of lines corresponding to the width Lb is performed by the discard printing process. Subsequently, a margin for the number of lines corresponding to the width Lc is formed by the second precursor process. After that, the printing for the number of lines corresponding to the width Ld, that is, the printing based on the printing data is performed by the printing process.

Herein, the significance of the first precursor process, the discard printing process, and the second precursor process will be described. First, the significance of the first precursor process will be described.

The inkjet head 100 uses a solvent-based ink. A solvent-based ink is an ink in which a pigment is dispersed in an organic solvent. There is also a solvent-based ink in which a pigment comprises glass particles. Solvent-based inks are extremely volatile. For this reason, ink readily volatilized from the surface of the meniscus formed at the nozzle 2, and thus, the viscosity of the ink increases with time. Then, in some cases, the ink is solidified. When the increase in viscosity of the ink or the ink solidification occurs, the nozzle may become clogged or otherwise malfunction so that the nozzle becomes a non-ejection (non-functional) nozzle from which the ink is not ejected during the printing process. As a result, low-quality printing with blurring or the like is obtained.

In order to improve the printing quality, the first precursor process is performed at the beginning of the printing process. By performing the first precursor process, the ink inside the pressure chamber 24 slightly vibrates but not so much as to be ejected from the nozzle 2. Due to this slight vibration, the viscosity of the ink in the nozzle is reduced, and the occurrence of non-ejection nozzles is suppressed.

Figure 12:
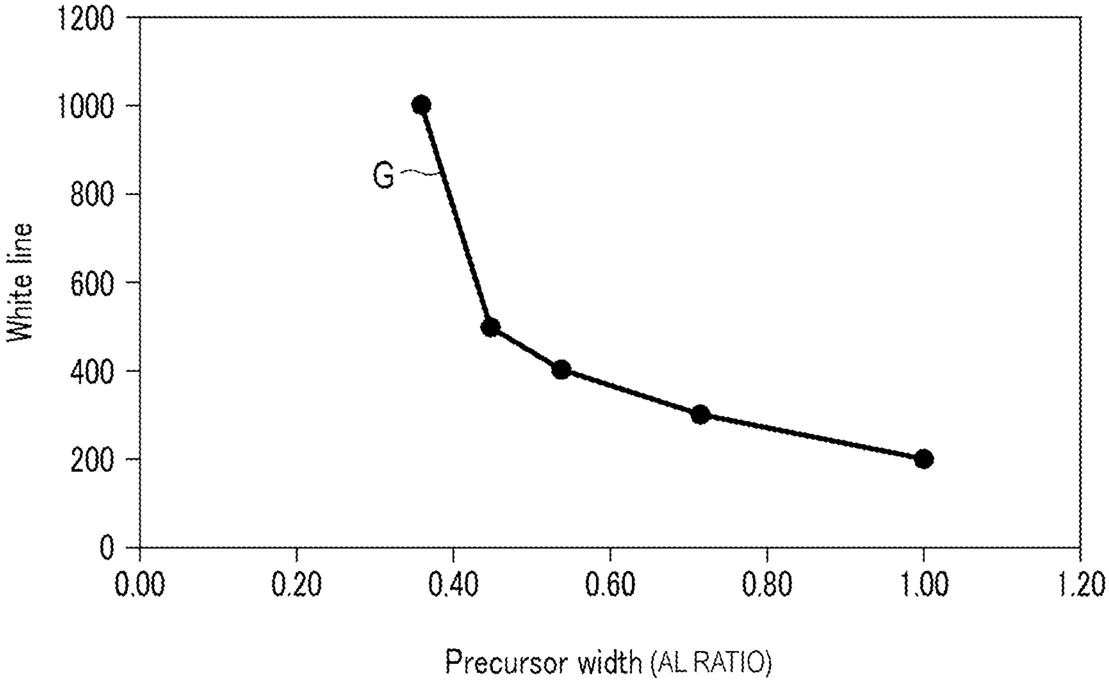
FIG. 12 is a graph illustrating a characteristic line related to a first precursor process included in a printing process.

FIG. 12 is a graph illustrating a characteristic line G related to the first precursor process. In the graph, the vertical axis is the number of white lines corresponding to the width La of the region 301, and the horizontal axis is the pulse width (also referred to as precursor width) of the precursor signal. The pulse width is represented as a ratio to a half time acoustic length (AL) of the characteristic vibration period 2AL of the ink. The pulse width of the precursor signal is set as the eighth time th illustrated in FIG. 9.

The characteristic line G is the limit of characteristics capable of obtaining high-quality printing without blurring when the first precursor process is performed on just the number of lines corresponding to the value on the vertical axis when the precursor signal has the pulse width corresponding to the value on the horizontal axis. By performing the first precursor process only for the number of lines corresponding to the pulse width with the precursor signal of the pulse width on the characteristic line G, stable ejection of the ink is realized at the time of the start of printing.

As described above, the first time Ta is set to a time required for achieving stable ink ejection at the time of the start of printing. By doing so, it is possible to prevent the increase in viscosity of the ink or the solidification of the ink and to suppress the occurrence of a non-ejection nozzle in which the ink is not ejected. As a result, it is possible to prevent low-quality printing with blurring in advance due to the non-ejection nozzle.

It is preferable that the number of lines corresponding to the width La of the region 301 is as small as possible for maximizing the region 304 in the printing process. As illustrated in FIG. 12, by increasing the pulse width of the precursor signal, the number of lines corresponding to the width La of the region 301 is decreased. Additionally, if the pulse width of the precursor signal is increased, the possibility of erroneous ejection is increased. In an embodiment, the precursor signal having a pulse width with an AL ratio of 0.7 is used. Accordingly, the number of lines corresponding to the width La of the region 301 becomes about 300 lines.

As described above, by performing the first precursor process before the start of printing, blurring and the like due to the non-ejection nozzle is prevented. However, for example, when a solvent-based ink having extremely high volatility is used, even though the first precursor process is performed to prevent the increase in viscosity of the ink or the solidification of the ink, the density of the edge portion which is the printing start position may be high. Such an event is caused because the ejection speed of the ink to be ejected immediately after the first precursor process is slower than that of the ink of the second drop and the subsequent drops. Then, this event also occurs even though the number of lines corresponding to the width La of the region 301 is changed. That is, in the case of highly volatile ink, even though the increase in viscosity of the ink or the solidification of the ink at the surface of the meniscus can be prevented by performing the first precursor process, the normal meniscus state cannot always be obtained.

Therefore, in the aforementioned embodiments, the discard printing process is performed after the first precursor process. The discard printing process is performed for the second time Tb. By performing the discard printing process, the ink at the meniscus is ejected. As a result, the density becomes high at the boundary between the region 301 which is the printing start position of the discard printing process and the region 302, but the density becomes constant at the boundary between the region 302 which is the printing end position of the discard printing process and the region 303.

As described above, the second time Tb is a time required for ejecting the ink that forms the meniscus in the nozzle 2. By doing so, it is possible to prevent the edge portion which is the printing start position of the region 304 from becoming high in density, and prevent deteriorating in quality.

If the region 302 printed by the discard printing process is in the vicinity of the region 304 printed by the printing process, the user may not be able to distinguish the printing by the discard printing process from the printing by the printing process. Therefore, in the aforementioned embodiments, the second precursor process is performed after the discard printing process. The second precursor process is performed for the third time Tc. By performing the second precursor process for the third time Tc, the margin having the width Lc is generated between the printing by the discard printing process and the printing by the printing process. Due to the margin, the user can distinguish the printing by the discard printing process from the printing by the printing process.

As described above, the third time Tc is set to a time required for the user to recognize that the printing with the ink ejected for the second time T2 is the discard printing. By doing so, it is possible to prevent the printing by the discard printing process from being indistinguishable from the printing by the printing process. Moreover, at the third time Tc, the second precursor process is performed. That is, the ink inside the pressure chamber slightly vibrates to the extent that the ink is not ejected from the nozzle 2. Therefore, the re-increase in viscosity of the ink or the re-solidification of the ink on the surface of the meniscus, which is improved by the discard printing process, is prevented, so that high-quality printing can be achieved.

As described above, it is possible to provide an inkjet head capable of performing high-quality printing even when highly volatile ink is used. In addition, it is possible to provide a method for driving an inkjet head capable of performing high-quality printing even when highly volatile ink is being used.

Although certain embodiments have been described, present disclosure is not limited thereto.

In the above-described embodiments, the discard printing is performed on the print medium 300. For example, in the case of a head movement type printer, the inkjet head is moved from the standby position to the printing position at the time of printing. During such movement, discard printing may be performed on to a saucer, discard plate, or the like. In addition, in the case of a one-pass type printer in which the recording medium is moved by a fixed head, the discard printing may be performed when the print medium 300 is not passing by the inkjet head.

For example, in the above-described embodiments, a solvent-based ink is used. The ink to be used is not limited to the solvent-based ink. General oil-based ink may be used. Highly volatile inks other than solvent-based inks may be used.

For example, due to the relationship between the size of the print medium 300 and the width Ld of the region 304 where the printing process is performed, if the third time Tc is set to a time corresponding to the width Lc, there is a possibility that the region 304 may protrude from the print medium 300. In such a case, the width Lc is reduced by shortening the third time Tc, and thus, the region 304 does not protrude from the print medium 300. In this manner, the third time Tc may be allowed to be appropriately variable.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An inkjet head for printing using a solvent-based glass ink, comprising:
- a pressure chamber in which the ink is to be stored;
- a nozzle plate including a nozzle which connects to the pressure chamber;
- an actuator configured to change a volume of the pressure chamber; and
- a drive circuit configured to, before printing is performed:
  - output a first signal to the actuator for a first time period for changing the volume of the pressure chamber such that the ink forms a meniscus in the nozzle without being ejected from the nozzle,
  - after outputting the first signal, output a second signal to the actuator for a second time period for changing the volume of the pressure chamber such that the ink is ejected from the nozzle, wherein the second time period is a time period required for the ink that has formed the meniscus to be ejected from the nozzle, and
  - after outputting the second signal, output a third signal to the actuator for a third time period for changing the volume of the pressure chamber without ejecting the ink from the nozzle, wherein
- a length of each of the first and third time periods is determined based on a half of a characteristic vibration period of the ink and a particular coefficient.

2. The inkjet head according to claim 1, wherein the first time period is a time period required for the ink to be stably ejected at the beginning of printing.

3. The inkjet head according to claim 1, wherein the third time period is a time period required for forming on a medium a margin having a predetermined width between the ink ejected by the second signal and the ink ejected during the printing.

4. The inkjet head according to claim 1, wherein one of the first and third signals includes:
- a first pulse by which a first voltage is applied to the actuator and having a first width,
- a second pulse by which a second voltage greater than the first voltage is applied to the actuator and having a second width less than the first width,
- a third pulse by which the first voltage is applied to the actuator and having a third width greater than the first width, and
- a fourth pulse by which a third voltage greater than the second voltage is applied to the actuator and having a fourth width less than the third width.

5. The inkjet head according to claim 4 wherein the first voltage is a negative voltage, the second voltage is a ground voltage, and the third voltage is a positive voltage.

6. The inkjet head according to claim 4, wherein the second signal includes:
- a first pulse by which the first voltage is applied to the actuator and having a fifth width,
- a second pulse by which the second voltage is applied to the actuator and having the second width,
- a third pulse by which the third voltage is applied to the actuator and having a sixth width, and
- a fourth pulse by which the second voltage is applied to the actuator and having a seventh width.

7. The inkjet head according to claim 6, wherein the sixth width is equal to a sum of the third and fourth widths.

8. The inkjet head according to claim 1, wherein the third time period is variable depending on a width of a printing area.

9. A method of driving an inkjet head configured to eject a solvent-based glass ink from a nozzle which connects to a pressure chamber by changing a volume of the pressure chamber using an actuator, the method comprising, before performing printing:
- outputting, to the actuator for a first time period, a first signal for changing the volume of the pressure chamber such that the ink forms a meniscus in the nozzle without being ejected from the nozzle;
- after outputting the first signal, outputting, to the actuator for a second time period, a second signal for changing the volume of the pressure chamber for ejecting the ink from the nozzle, wherein the second time period is a time period required for the ink that has formed the meniscus to be ejected from the nozzle; and
- after outputting the second signal, outputting, to the actuator for a third time period, a third signal for changing the volume of the pressure chamber without ejecting the ink from the nozzle, wherein
- a length of each of the first and third time periods is determined based on a half of a characteristic vibration period of the ink and a particular coefficient.

10. The method according to claim 9, wherein the first time period is a time period required for the ink to be stably ejected at the beginning of printing.

11. The method according to claim 9, wherein the third time period is a time period required for forming on a medium a margin having a predetermined width between the ink ejected by the second signal and the ink ejected during the printing.

12. The method according to claim 9, wherein one of the first and third signals includes:
- a first pulse by which a first voltage is applied to the actuator and having a first width,
- a second pulse by which a second voltage greater than the first voltage is applied to the actuator and having a second width less than the first width,
- a third pulse by which the first voltage is applied to the actuator and having a third width greater than the first width, and
- a fourth pulse by which a third voltage greater than the second voltage is applied to the actuator and having a fourth width less than the third width.

13. The method according to claim 12 wherein the first voltage is a negative voltage, the second voltage is a ground voltage, and the third voltage is a positive voltage.

14. The method according to claim 12, wherein the second signal includes:

a first pulse by which the first voltage is applied to the actuator and having a fifth width, a second pulse by which the second voltage is applied to the actuator and having the second width, a third pulse by which the third voltage is applied to the actuator and having a sixth width, and a fourth pulse by which the second voltage is applied to the actuator and having a seventh width.

15. The method according to claim 14, wherein the sixth width is equal to a sum of the third and fourth widths.

16. An inkjet printer for printing using a solvent-based glass ink, comprising:

an inkjet head including:

a pressure chamber in which the ink is to be stored, a nozzle plate including a nozzle which connects to the pressure chamber, an actuator configured to change a volume of the pressure chamber, and a drive circuit configured to, before printing is performed:

output, to the actuator for a first time period, a first signal for changing the volume of the pressure chamber such that the ink forms a meniscus in the nozzle without being ejected from the nozzle, after outputting the first signal, output, to the actuator for a second time period, a second signal for changing the volume of the pressure chamber such that the ink inside the pressure chamber is ejected from the nozzle, wherein the second time period is a time period required for the ink that has formed the meniscus to be ejected from the nozzle, and after outputting the second signal, output, to the actuator for a third time period, a third signal for changing the volume of the pressure chamber to the extent that the ink is not ejected from the nozzle; and a processor configured to control the inkjet head to print an image on a sheet through the printing after the first, second, and third signals are output, wherein a length of each of the first and third time periods is determined based on a half of a characteristic vibration period of the ink and a particular coefficient.

* * * * *